B. FOLTZ.
Neck-Yoke Attachment.
No. 6,366. Reissued April 6, 1875.
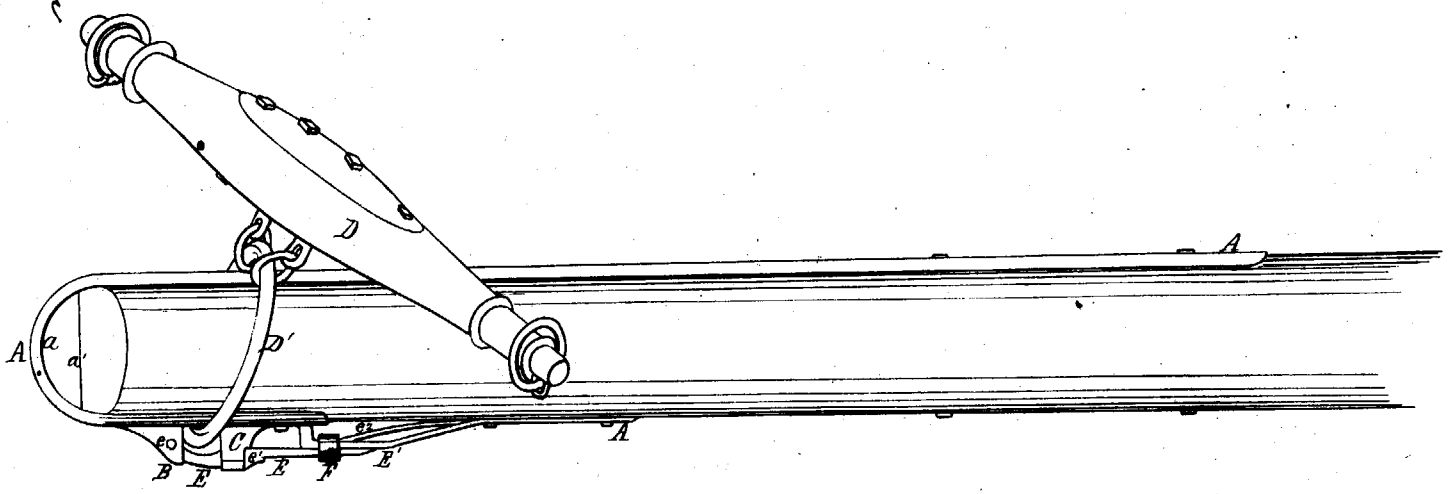
Witnesses:
Alex Mahon
H. B. Barclay
Inventor:
Benjamin Foltz
by W. Ford, attorney,
by A. M. Smith
associate
THE GRAPHIC CO. PHOTO-LITH. 39 & 41 PARK PLACE, N.Y.

UNITED STATES PATENT OFFICE

BENJAMIN FOLTZ, OF ROCKFORD, ILLINOIS.

IMPROVEMENT IN NECK-YOKE ATTACHMENTS.

Specification forming part of Letters Patent No. 85,519, dated January 5, 1869; reissue No. 6,366, dated April 6, 1875; application filed January 20, 1875.

*To all whom it may concern:*

Be it known that I, BENJAMIN FOLTZ, of Rockford, county of Winnebago and State of Illinois, have invented certain new and useful Improvements in Irons for Carriage-Poles, of which the following is a full, clear, and exact description, reference being had to the accompanying drawing, making part of this specification.

The object of my invention is threefold: First, to secure the neck-yoke to the pole in such manner that said neck-yoke cannot be easily detached therefrom by accident; second, to prevent the lines from becoming caught under the end of the tongue when they are allowed to become slack, or by the motion of the horse's head, it being well known that serious accidents frequently occur from both of these causes; and, third, to secure lightness and neatness of finish, durability, strength, and economy of manufacture.

To this end this invention consists in a novel construction and combination of the devices by means of which the neck-yoke ring is locked to the pole by the lever or guard, which is pivoted to the lug on the lower strap, which is bolted to the pole; and certain advantages are obtained, as will be hereinafter fully set forth.

In the drawings, A represents the main iron or strap, the legs of which are bolted or otherwise secured to the pole, the front or closed end *a* projecting a short distance from the end of the tongue, in the usual manner. B is a lug or shoulder projecting from the lower leg of the strap. C is a similar lug, a little to the rear of B, and of greater length. Both of these lugs may be slotted longitudinally of the tongue. D is the neck-yoke, provided with the usual ring D′, of a little greater diameter than that of the pole, and lug B is of such length as to permit ring D′ to pass over it, lug C being, by preference, longer, so that said ring shall not pass it. E is a safety-guard, pivoted or hinged to lug B at *e*, and so arranged as to pass over and behind lug C. The free end of guard E is provided with a shoulder or shoulders, *e′*, at such distance from pivot *e* that when the guard is closed the shoulder or shoulders shall engage with the rear side of lug C, thus clamping the two lugs to each other, and making them mutually support each other, against either the forward or backward thrust of the neck-yoke.

It will be readily seen that if the guard E be thrown forward so as to be in line with the pole, the neck-yoke ring D′ may be slipped over lug B into place, and that when the guard is replaced in the position shown in the drawings the ring cannot escape. But it is necessary to secure the guard in position. This might be accomplished in many ways, as, for instance, it might be fastened to lug C by a bolt or a spring, in which case it might be made short so as to only reach said lug, and the bolt would cause the guard to link the two lugs together, as the shoulders *e′* do; but, by preference, I make the guard long enough to extend back and rest upon a skeleton seat, E′, attached to or joined in one piece with the lower leg of the strap A.

F is a ring, which serves to confine the free end of the guard to seat E′. $e^2$ is a tongue-spring, the rear end of which is secured to the strap, the front end bearing against ring F in such a manner as to retain it (the ring) in the position shown in the drawings.

The neck-yoke can be removed by slipping the ring F backward, so as to release the guard, and then throwing said guard open and forward.

Neck-yoke rings are sometimes made of leather, in which case the hole in them is usually of just sufficient diameter to receive the pole, and in order to adapt my invention for use in connection with this class of neck-yoke I modify the construction shown in the drawings as follows: Instead of forming lug B upon and rigid with the strap, I make it in the shape of a ring, which can be passed over the end of the pole and then attach the guard E to it, (the ring,) so that when the guard is secured to the lug C the neck-yoke ring is inclosed and confined to the pole in substantially the same manner as it is in the drawings.

The lugs B C may be placed near each other, and if the inner corner of B to C be rounded, the ring of the neck-yoke will have free play. I am able to place lug B near the end of the pole, and if the sides of the end of the pole be clipped or beveled, and the iron correspondingly formed, as at *a′*, the lines will not be liable to be caught on the pole, as is now frequently the case, particularly as the space between the ends of the lugs B C is bridged over by the guard. Neither can the lines get caught behind lug C, on account of the heel end of guard.

It will be observed that the labor of ironing poles by my method is less than in the ordinary manner, (the spring $e^2$ excepted,) as the parts can be made of malleable cast-iron, of sizes adapted to the different vehicles, and cheaply applied.

Having now described my invention, what I claim, and desire to secure by Letters Patent, is—

1. In combination with a wagon-pole, the lugs B C, guard E, and locking devices, to retain the free end of the guard in contact with lug C, to inclose neck-yoke ring D′, substantially as set forth.

2. In combination with pole-strap A, having lugs B C, the guard E, provided with the shoulder or shoulders $e^1$, for clamping the lugs to each other, substantially as and for the purpose set forth.

3. In combination with the lugs B and C, the guard E, provided with the heel extension, substantially as and for the purpose described.

4. The combination of the lugs B C, guard E, rest or seat E′, and spring $e^2$, substantially as and for the purpose described.

This specification signed and witnessed this 12th day of January, 1875.

BENJAMIN FOLTZ.

Witnesses:
G. W. FORD,
CHARLIE S. FORD.